(12) United States Patent  (10) Patent No.: US 9,712,758 B2
Noda  (45) Date of Patent: Jul. 18, 2017

(54) IMAGING APPARATUS AND IMAGING METHOD

(71) Applicant: Olympus Corporation, Shibuya-ku, Tokyo (JP)

(72) Inventor: Masatoshi Noda, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/061,598

(22) Filed: Mar. 4, 2016

(65) Prior Publication Data
US 2016/0286109 A1 Sep. 29, 2016

(30) Foreign Application Priority Data
Mar. 26, 2015 (JP) .................................. 2015-064572

(51) Int. Cl.
*H04N 5/238* (2006.01)

(52) U.S. Cl.
CPC .................................. *H04N 5/238* (2013.01)

(58) Field of Classification Search
None
See application file for complete search history.

(56) References Cited

FOREIGN PATENT DOCUMENTS

JP   11-183778    7/1999
JP   2013-031010  2/2013

*Primary Examiner* — Stephen Coleman
(74) *Attorney, Agent, or Firm* — John C. Pokotylo; Straub & Pokotylo

(57) ABSTRACT

An imaging apparatus, comprising a lens unit having a photographing optical system, and a body having an image sensor for generating a pixel signal by imaging subject light that has passed through the photographing optical system, comprising an exposure control section for adjusting exposure amount for image data based on a pixel signal generated by the image sensor, by transmitting an aperture control signal to the aperture control section and changing opening of the aperture, and a determination section for determining whether or not the aperture control section is able to control opening of the aperture based on information from the lens unit, wherein the exposure control section does not transmit aperture control signals to the aperture control section when it is determined by the determination section that the aperture control section is able to control opening of the aperture.

12 Claims, 6 Drawing Sheets

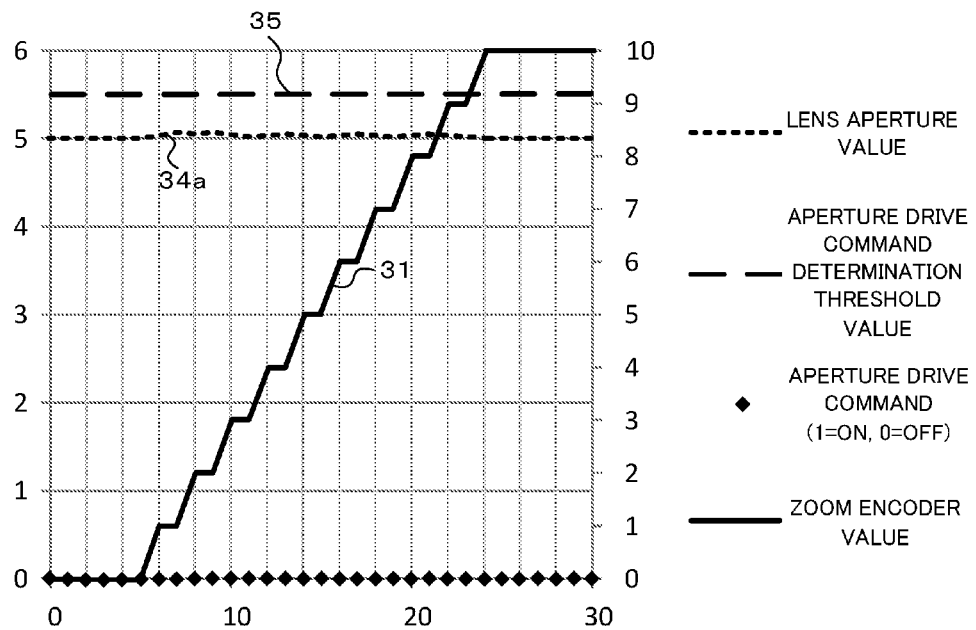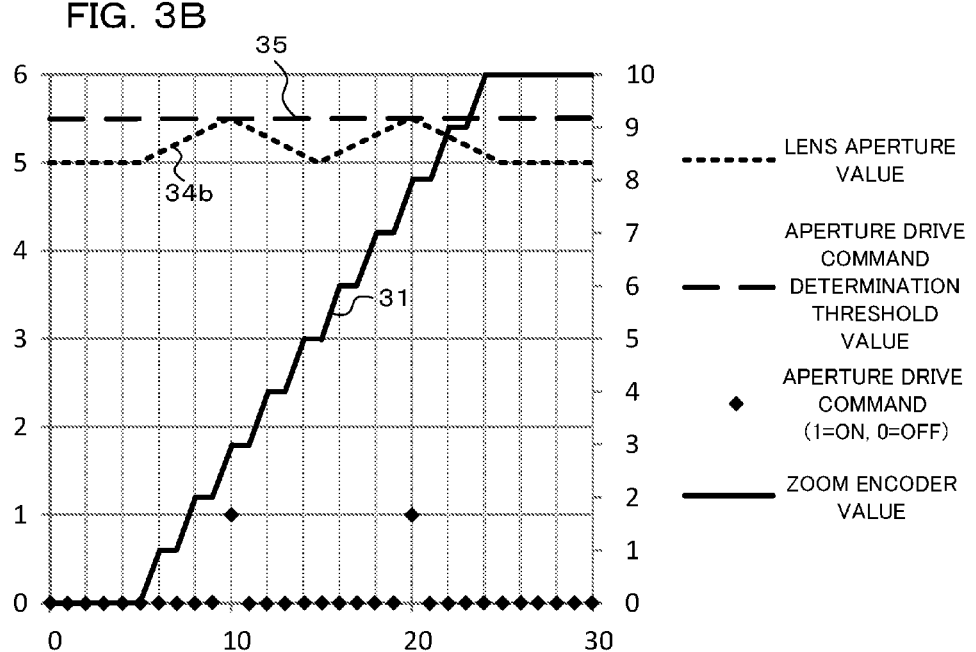

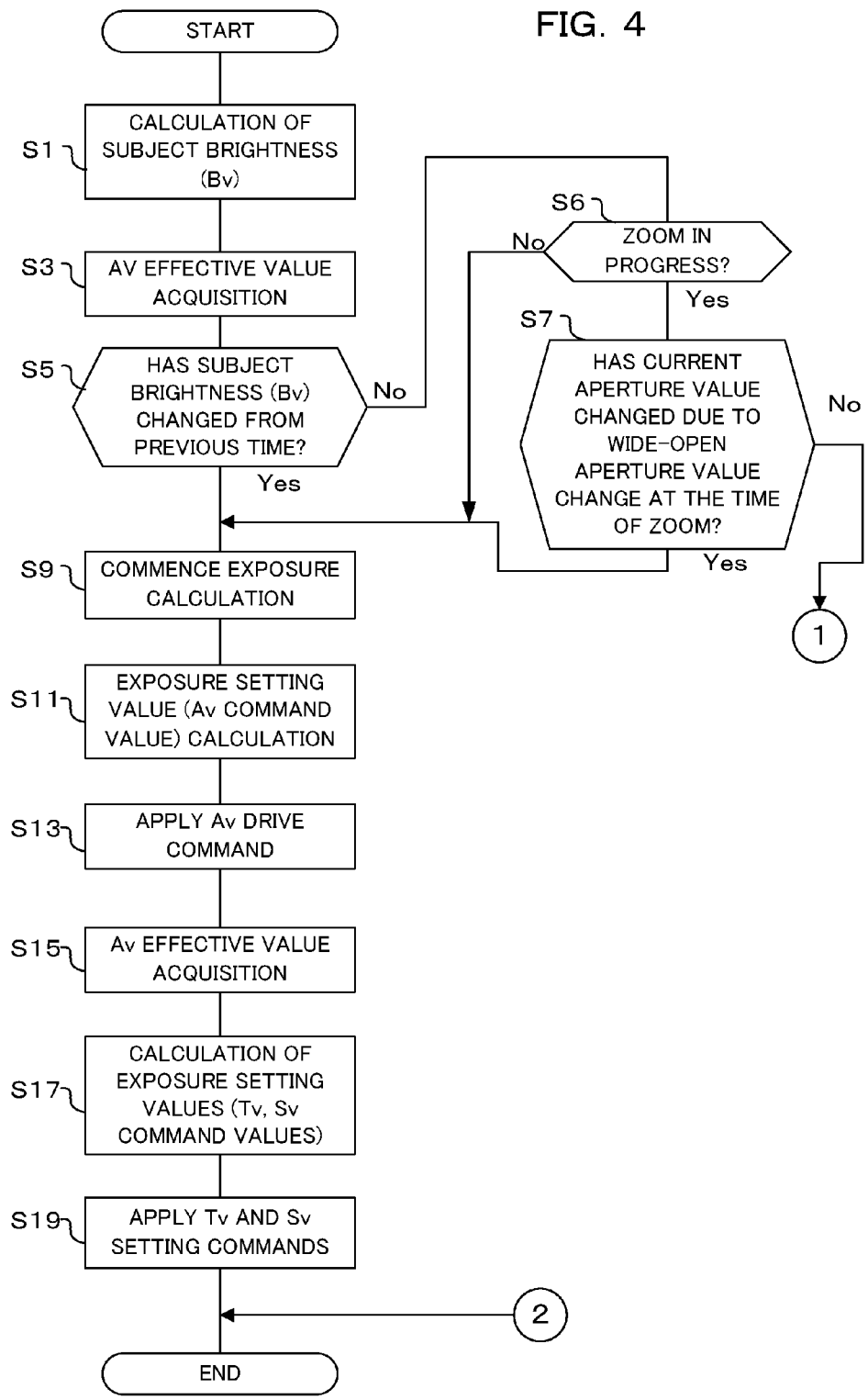

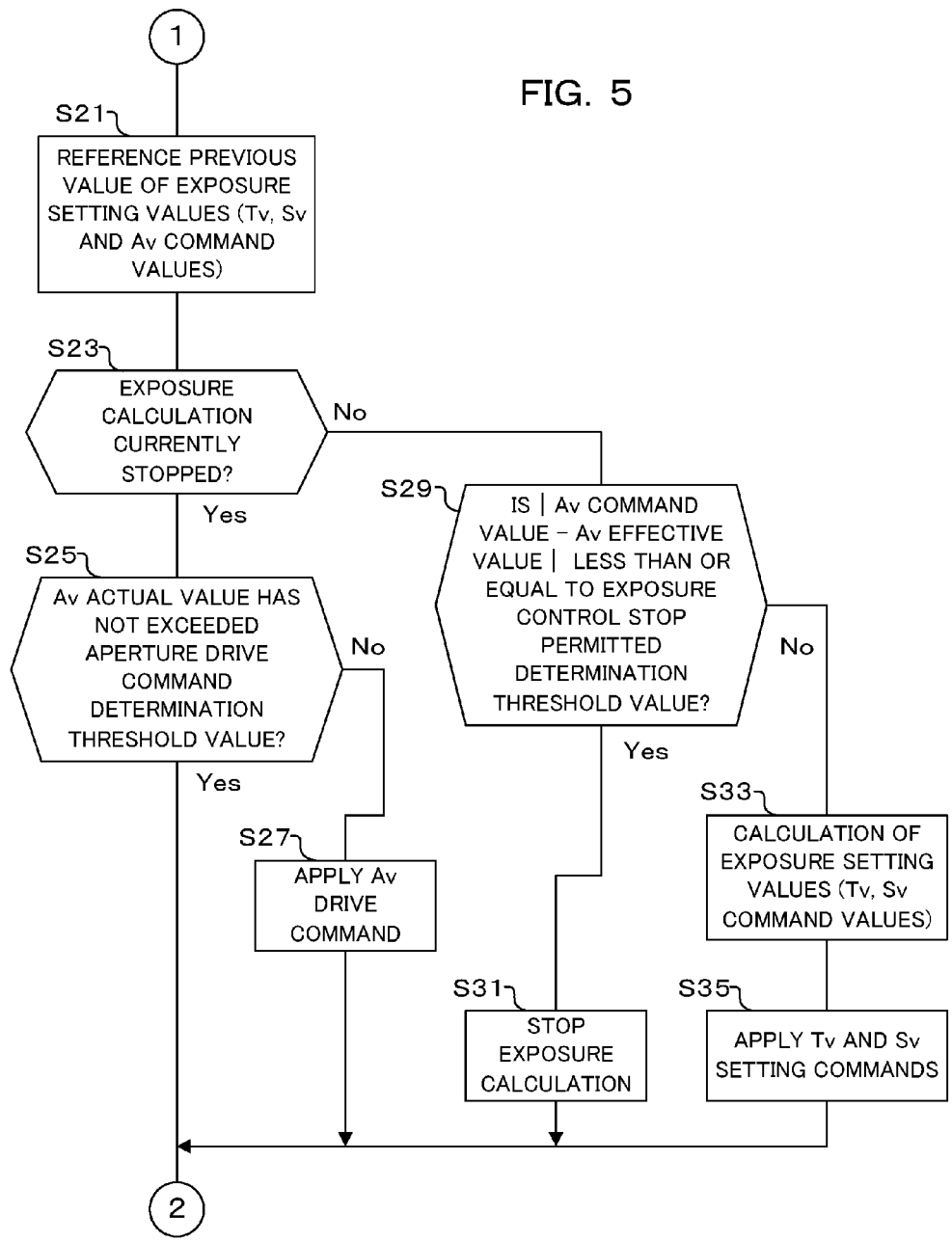

IMAGING APPARATUS AND IMAGING METHOD

Benefit is claimed, under 35 U.S.C. §119, to the filing date of prior Japanese Patent Application No. 2015-064572 filed on Mar. 26, 2015. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus and imaging method capable of exposure control so as to give appropriate exposure, even in a case where aperture value has changed at the time of movie shooting and at the time of live view display.

2. Description of the Related Art

With an imaging device such as a camera, when driving an aperture at the time of movie shooting or at the time of live view display an appropriate exposure amount is maintained by simultaneously adjusting electronic shutter speed and ISO sensitivity. However, whereas there is delay in movement due to the fact that an aperture is driven mechanically, since electronic shutter speed and ISO sensitivity are electrically controlled there is almost no time lag in an operation of changing these values. As a result a time difference arises until an exposure it is desired to set is reached, and flicker arises in images for a movie or live view display, resulting in a visually undesirable screen.

An imaging apparatus has therefore been proposed that calculates a predicted value for current aperture position from aperture drive speed and target value, and electronic shutter speed and ISO sensitivity are set in order to operate in accordance with an aperture value that has been predicted (refer, for example, to Japanese patent laid-open No. 2013-031010 (hereafter referred to as "patent publication 1")).

Also, an interchangeable lens, with which aperture value (FNo) is changed in accordance with change in focal length due to a zoom operation, in a state where aperture opening diameter is fixed, is generally used. With this type of interchangeable lens, focal length information in accordance with a zoom operation is transmitted to the camera body, and aperture control commands are transmitted from the camera body to the interchangeable lens so as to fix the aperture value (FNo). In this case, the interchangeable lens performs control to keep the aperture value (FNo) fixed by varying opening diameter in accordance with aperture control commands (refer, for example, to Japanese patent laid-open No. Hei. 11-183778 (hereafter referred to as "patent publication 2")).

With patent publication 1 described above, electronic shutter speed and ISO sensitivity are controlled based on a predicted value for aperture value, which means that exposure fluctuation is suppressed and it is possible to alleviate image flicker. However, it is difficult to get a predicted value and actual aperture value to coincide completely, and as a result exposure fluctuations will arise at the time of movie shooting and at the time of live view display, causing image flicker. Also, in the case where a zoom operation is carried out during movie recording, if an aperture operation is carried out in order to keep the aperture value (FNo) fixed, there is a problem that flicker will arise in the image and image quality is lowered.

SUMMARY OF THE INVENTION

An object of the present invention is to provide an imaging apparatus and an imaging method that limit lowering of image quality of an image that is taken while a zoom operation is in progress.

An imaging apparatus of the present invention, comprises a lens unit having a photographing optical system, and a body, to which the lens unit can be attached, having an image sensor for generating a pixel signal by imaging subject light that has passed through the photographing optical system, wherein: the lens unit comprises an aperture which restricts light flux that passes through the photographing optical system, a zoom control section for adjusting focal length of the photographing optical system, and an aperture control section which controls opening of the aperture, and the body comprises an exposure control section which adjusts exposure amount for image data based on a pixel signal generated by the image sensor, by transmitting an aperture control signal to the aperture control section and changing opening of the aperture, and a determination section for determining whether or not the aperture control section is able to control opening of the aperture based on information from the lens unit, wherein the exposure control section does not transmit the aperture control signal to the aperture control section when it is determined by the determination section that the aperture control section is able to control opening of the aperture.

An imaging method of the present invention, for an imaging apparatus comprising a lens unit having a photographing optical system, and a body, to which the lens unit can be attached, having an image sensor for generating a pixel signal by imaging subject light that has passed through the photographing optical system, wherein: in the lens unit, light flux passing through the photographing optical system is restricted using an aperture, focal length of the photographing optical system is adjusted, and opening of the aperture is controlled, and in the body, exposure amount for image data is adjusted based on a pixel signal generated by the image sensor, by transmitting an aperture control signal to the lens unit and changing opening of the aperture, it is determined whether or not the opening of the aperture can be controlled based on information from the lens unit, and aperture control signals are not transmitted to the lens unit if it is determined that opening of the aperture is able to be controlled.

BRIEF DESCRIPTION OF THE DRAWINGS

FIG. 3A and FIG. 3B are graphs showing aperture control operation in a camera of one embodiment of the present invention, with FIG. 3A showing a graph showing aperture control operation in a case where a movie compliant lens is attached, and FIG. 3B showing a graph showing aperture control operation in a case where a non-movie compliant lens is attached.

FIG. 4 is a flowchart showing an exposure control operation in a camera body, in the camera of one embodiment of the present invention.

FIG. 5 is a flowchart showing an exposure control operation in a camera body, in the camera of one embodiment of the present invention.

DETAILED DESCRIPTION OF THE PREFERRED EMBODIMENTS

An example where a digital camera is adopted as one embodiment of the present invention will be described in the following. This digital camera has an imaging section, with a subject image being converted to image data by this imaging section, and the subject image being subjected to live view display on a display section arranged on the rear surface of the camera body or in an electronic viewfinder, based on this converted image data. A photographer determines composition and shooting timing while observing the live view display. If a movie button or the like is operated, recording of image data for a movie is commenced, and if the movie button or the like is operated again recording of image data for a movie is finished. It is also possible to shoot still pictures by operating a release button. Still picture and movie image data that has been stored in a storage medium can be subjected to playback display on a display section if playback mode is selected.

Also, the camera of this embodiment determines whether or not there is aperture control at a lens side, and if control can be carried out aperture control signals are not transmitted from the camera body to the lens side (refer to S25 in FIG. 5 for details).

Figure 1:
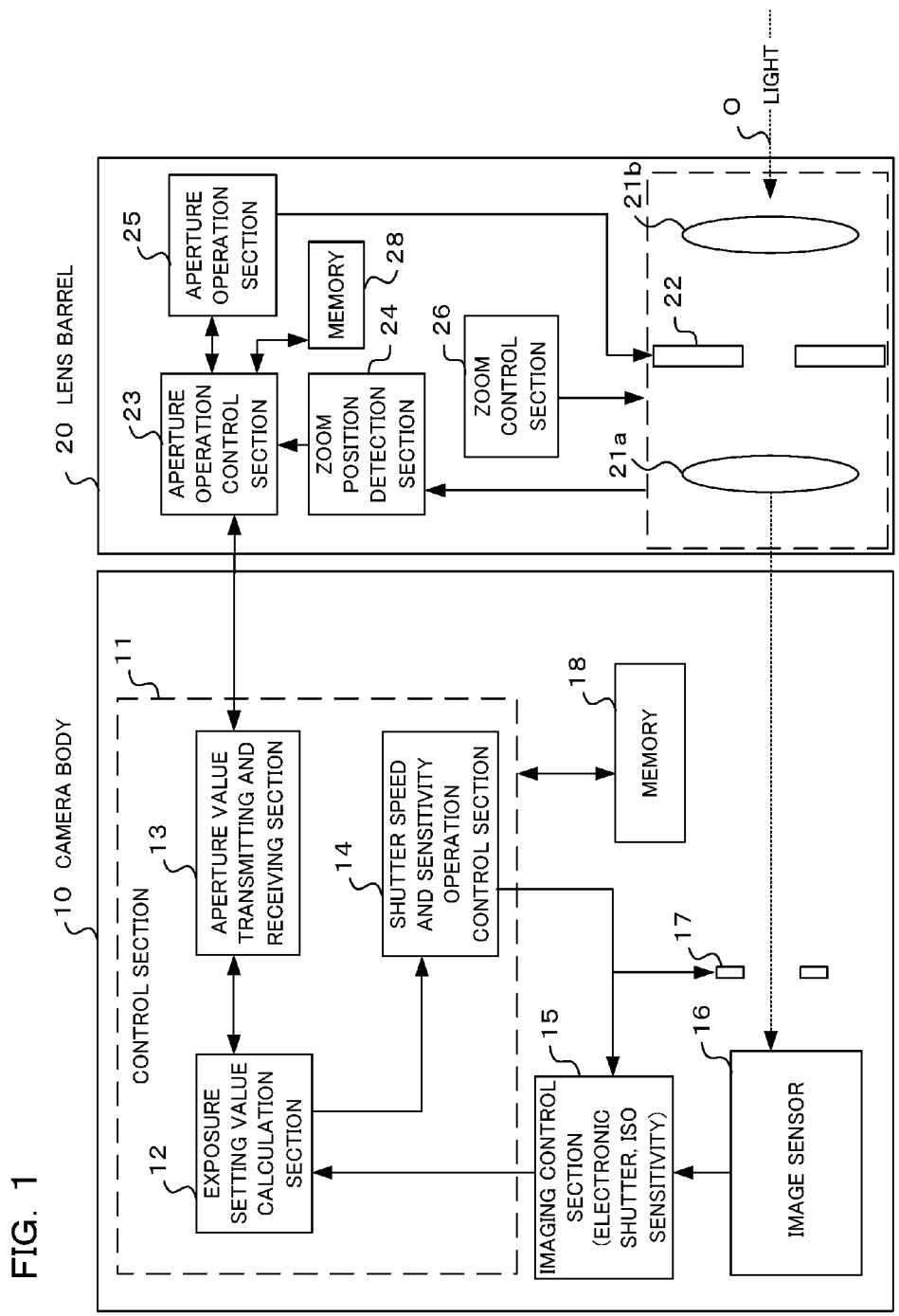
FIG. 1 is a block diagram mainly showing the electrical structure of a camera of one embodiment of the present invention.

FIG. 1 is a block diagram mainly showing the electrical structure of the camera of this embodiment. This camera has a camera body 10 and a lens barrel 20 that can be attached to the camera body 10. Specifically, the camera as the imaging apparatus of this embodiment is made up of a lens barrel (lens unit) 20 having a photographing optical system, and a camera body 10, to which the lens barrel 20 can be attached, having an image sensor for generating a pixel signal by imaging subject light that has passed through the photographing optical system. It should be noted that this embodiment is a so-called interchangeable lens type camera where the camera body 10 and the lens barrel 20 are formed separately. However, this is not limiting, and this embodiment maybe a camera having a lens barrel formed integrally with the camera body.

A control section 11, imaging control section 15, image sensor 16 and mechanical shutter 17 are arranged within the camera body 10.

The mechanical shutter 17 is a so-called focal plane shutter or lens shutter, arranged to the front of the image sensor 16. This mechanical shutter 17 allows subject light flux from the lens barrel 20 to pass for a given exposure time (determined by shutter speed) at the time of still picture shooting. Also, the mechanical shutter 17 is in an open state at the time of movie shooting and at the time of live view display.

The image sensor 16 is arranged on an extension of an optical axis O of the optical system of the lens barrel 20. The image sensor 16 has a plurality of photoelectric conversion pixels, receives light of a subject image (optical image) that has been imaged by the lens barrel 20 on an imaging surface, subjects this subject image to photoelectric conversion using each of the photoelectric conversion pixels, generates a pixel signal, and outputs the pixel signal to the imaging control section 15.

The imaging control section 15 has an imaging control circuit, and carries out readout control of a pixel signal from the image sensor 16 based on control signals from the control section 11. The image sensor 16 has an electronic shutter function, and the imaging control section 15 can control exposure time (electronic shutter speed) at the plurality of photoelectric conversion pixels of the image sensor 16. The imaging control section can also control ISO sensitivity by amplifying a pixel signal that has been read out from the plurality of photoelectric conversion pixels at a given amplification factor.

The control section 11 includes a CPU (Central Processing Unit) and peripheral circuits such as an ASIC (Application Specific Integrated Circuit), and carries out control of the camera body 10 and the lens barrel 20. Specifically, the CPU carries out overall control of the camera in accordance with programs that have been stored in a non-volatile memory 18, such as flash memory. There are an exposure setting value calculation section 12, aperture value transmission and reception section 13, and shutter speed and sensitivity operation control section 14 within the control section 11. The aperture value transmission and reception section 13 includes a communication circuit, and each section is implemented as software using the CPU.

Also, the control section 11 functions as an exposure calculation section for calculating exposure amount for image data based on a pixel signal generated by the image sensor. This exposure calculation section stops exposure calculation in the event that the determination section determines that an aperture has been driven fully, as will be described later, by an aperture control section (refer to S31 in FIG. 5).

Also, the control section 11 functions as a determination section for determining whether or not the aperture control section is able to control aperture opening based on information from the lens unit (lens barrel 20) (refer to S25 in FIG. 5). This determination section determines that the aperture control section is able to control aperture opening based information on aperture opening (Av effective value) (refer to S25 in FIG. 5). This determination section determines whether or not the aperture control section is able to control aperture opening by comparing an aperture control signal of the exposure control section with aperture opening information. This determination section stops calculation of exposure control value in a case where it is determined that a difference between the aperture control and the aperture opening information is within a given range (refer to S31 in FIG. 5).

The exposure setting value calculation section 12 within the control section 11 is input with a pixel signal from the imaging control section 15, and based on this pixel signal calculates aperture value, mechanical shutter speed, electronic shutter speed and ISO sensitivity etc. in order to achieve correct exposure from subject brightness, and outputs these calculated values to the aperture value transmission and reception section 13 and the shutter speed and sensitivity operation control section 14. Also, the exposure setting value calculation section 12 is input with aperture value information from the lens barrel 20 side by means of the aperture value transmission and reception section 13. The exposure setting value calculation section 12 functions as an exposure control section for adjusting exposure amount for image data based on the pixel signal generated by the image sensor, by transmitting an aperture control signal to the aperture control section and changing aperture opening (refer to S13 in FIG. 4 and S27 in FIG. 5). This exposure control section also transmits an aperture control signal to the aperture control section if it is determined by the determination section that aperture opening is not able to be controlled by the aperture control section.

The aperture value transmission and reception section 13 has a communication circuit for transmitting and receiving between the camera body 10 and the lens barrel 20, and transmits an aperture value that has been calculated by the exposure setting value calculation section 12 at the camera body 10 side to the aperture operation control section 23 at the lens barrel 20 side. Also, in the event that the lens barrel 20 side aperture operation control section 23 has changed aperture value based on focal length (zoom encoder value) that has been detected by the zoom position detection section 24, the aperture value transmission and reception section 13 receives this changed aperture value that has been transmitted by the aperture operation control section 23.

The shutter speed and sensitivity operation control section 14 is input with electronic shutter speed and ISO sensitivity that have been calculated by the exposure setting value calculation section 12, and carries out operation control so as to attain the input electronic shutter speed and ISO sensitivity. The shutter speed and sensitivity operation control section 14 also carries out control of the mechanical shutter 17, at the time of still picture shooting, so as to attain a shutter speed that has been calculated by the exposure setting value calculation section 12. At the time of movie shooting or at the time of live view display, the shutter speed and sensitivity operation control section 14 is put in a state where the mechanical shutter 17 is open.

The memory 18 includes electrically rewritable nonvolatile memory, and electrically rewritable volatile memory. The memory 18 stores programs for allowing operation of the CPU within the camera body 10, and various data such as adjustment values for the camera body 10. Image data for already taken still pictures and movies are also stored.

A front group lens 21b, a rear group lens 21a, aperture 22, the aperture operation control section 23, a zoom position detection section 24, an aperture operation section 25, and a zoom control section 26 are provided within the lens barrel 20.

The front group lens 21b and the rear group lens 21a (when being described collectively referred to as photographing lens 21 or photographing optical system) can allow a subject image to be formed on an imaging surface of the image sensor 16 by adjusting a focus lens within the photographing lens 21. It is also possible to change focal length by adjusting a zoom lens within the photographing lens 21.

The aperture 22 is arranged in the optical path of the photographing lens 21. The aperture 22 is capable of having opening diameter variably driven mechanically by the aperture operation section 25. By changing the opening diameter it is possible to change subject light amount that is incident on the image sensor 16. Specifically, the aperture 22 functions as an aperture for restricting light that passes through the photographing optical system.

The zoom position detection section 24 has a so-called zoom encoder, and detects position of a zoom lens within the photographing lens 21 for output to the aperture operation control section 23.

The zoom control section 26 has a motor and a zoom drive mechanism, and performs drive control of the zoom lens of the photographing lens 21 in response to a manual operation by the photographer. This zoom control section 26 functions as a zoom control section for adjusting focal length of the photographing optical system. It should be noted that besides powered drive control using an actuator, the zoom control section may also be of a type where drive is performed directly and manually by the photographer.

The aperture operation control section 23 controls the aperture operation section 25 so as to attain an aperture value that has been input by means of the aperture value transmission and reception section 13, as was described previously. The aperture operation control section 23 also controls the aperture operation section 25 so as to keep an aperture value constant, in accordance with focal length that has been detected by the zoom position detection section 24. The aperture operation section 25 has a motor and an aperture drive mechanism, and allows variation in the opening diameter of the aperture 22. The aperture operation control section 23 functions as an aperture control section for controlling aperture opening in accordance with focal length that has been adjusted by the zoom control section (refer to S47 in FIG. 6A).

A memory 28 includes electrically rewritable nonvolatile memory, and electrically rewritable volatile memory. The memory 28 stores programs for allowing operation of the CPU within the lens barrel 20, and various data such as adjustment values for the lens barrel 20 and various optical characteristics of the lens barrel 20.

Figure 2:
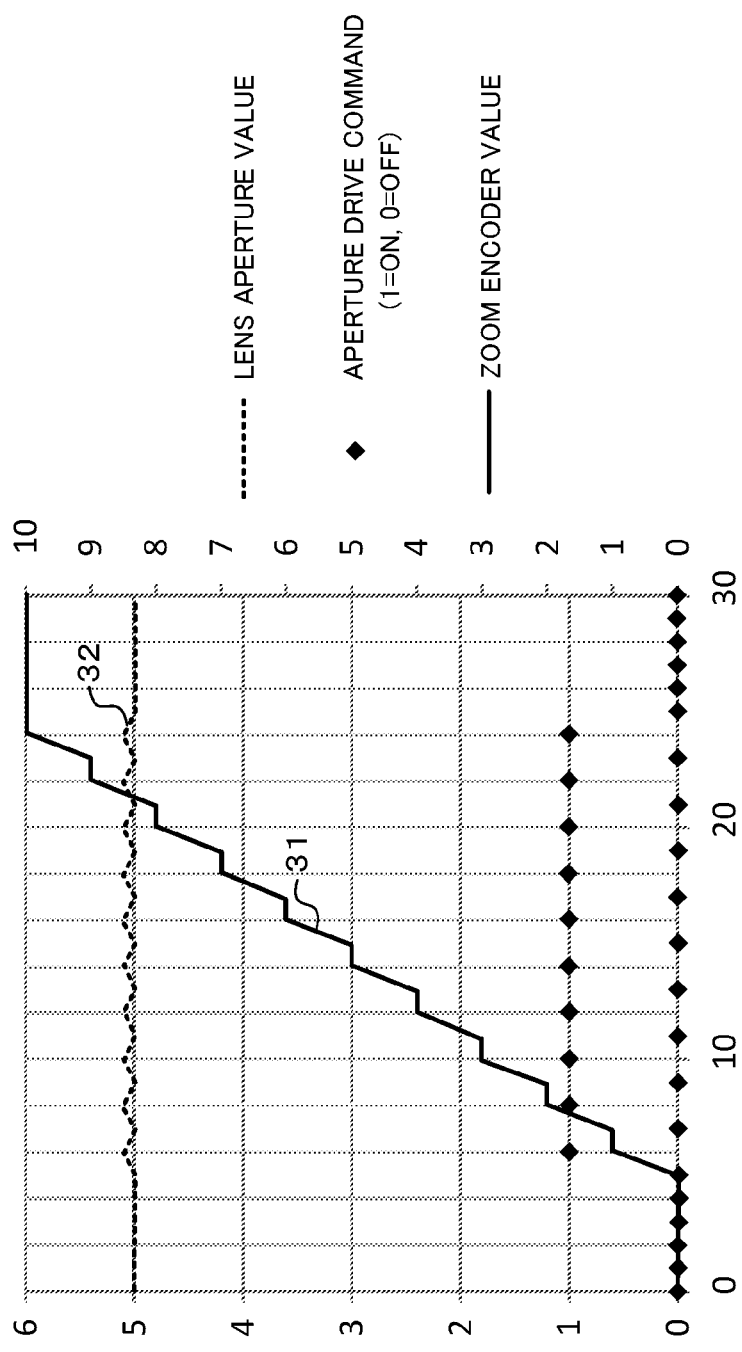
FIG. 2 is a graph showing an aperture control operation, in a conventional camera.

Next, the aperture control operation of this embodiment will be described using FIG. 2, FIG. 3A, and FIG. 3B. In order to simplify understanding of the aperture control operation of this embodiment, first a conventional aperture control operation will be described using FIG. 2.

As was described previously, for movie recording and live view display, even if an aperture value for the photographing lens is predicted, errors arise between the predicted value and the actual aperture value. This means that it is not possible to make variations in ISO sensitivity and electronic shutter speed that have been obtained by exposure calculation based on the predicted value for aperture value completely coincide with actual variations in aperture value, and errors arise with respect to optimum exposure. Because this error exists, if the exposure parameters (ISO sensitivity and electronic shutter speed) are also controlled at the same time as aperture drive, flicker will arise in brightness of a movie that is being recorded or live view display.

Also, in movie recording and live view display, at the time of carrying out aperture control in order to keep aperture value (FNo) fixed in accordance with a zoom operation, the camera body outputs drive commands for the aperture every time a zoom encoder value is updated, for example. In this case, a lot of aperture drive commands are output in an extremely short period of time, and seamless change in aperture value is impaired, causing flicker in an image. With the example shown in FIG. 2, the horizontal axis represents time and if zoom encoder value changes as shown by the solid line 31 in the drawing, aperture drive commands are output for every update (in the drawing, command timing is shown by diamonds). Every time an aperture drive command is issued, the lens aperture value is changed little by little, as shown by the dashed line 32 in the drawing. Flicker is caused in the image in accordance with this little by little change in the aperture value.

A mid-zoom aperture tracking function may also be provided where the lens barrel 20 is operated to maintain aperture value (FNo) at the lens side during a zoom operation. Depending on the structure of the optical system of the lens barrel 20, if the focal length is changed, the aperture value may sometimes change even if opening diameter of the aperture 22 is fixed. For this reason there are lens barrels provided with a mid-zoom aperture tracking function where, should the focal length be changed, opening diameter is changed in accordance with change in the focal length so that the aperture value (FNo) does not change. A lens barrel provided with such a tracking function is called a movie compliant lens barrel, while the lens barrel that is not provided with such tracking function is called a non-compliant lens.

In the event that a movie compliant lens barrel is fitted, if an aperture drive command is output from the camera body 10 every time the zoom encoder value is updated, the mid-zoom aperture tracking operation using the lens barrel 20 is interfered with. With this embodiment, therefore, it is made possible to carry out exposure control so that the occurrence of flicker in a movie that is being recorded or a live view display image during a zoom operation is suppressed, regardless of the respective movie compliant or non-compliant lens characteristics.

Aperture drive control for a case where a movie compliant lens barrel is fitted is shown in FIG. 3A, while aperture drive control for a case where a non-compliant lens barrel is fitted is shown in FIG. 3B. Based on subject brightness (Bv) change information it is determined whether only the aperture is moved, or whether exposure control for parameters other than the aperture (electronic shutter speed, ISO sensitivity) are controlled at the same time, and AE (Auto Exposure) is carried out as required. Specifically, information on actual aperture value (Av effective value, described later) acquired by the lens barrel 20 is compared with a threshold value (aperture drive command threshold value, described later) to determine whether an aperture drive command is issued, and aperture drive respectively corresponding to a movie compliant/non-compliant lens is carried out.

It should be noted that with this embodiment, at the time of movie recording or during live view display stabilization processing (clip processing etc.) is applied to subject brightness that has been calculated from pixel data that is output from the image sensor 16, such that abrupt change in subject brightness is not tracked, preventing lowering of visual quality.

In a case where a movie compliant lens barrel shown in FIG. 3A is attached, if the zoom position detection section 24 detects change in focal length (zoom encoder value) at the lens barrel 20 side, the aperture operation control section 23 controls opening diameter of the aperture 22 in accordance with this detected focal length so that an aperture value (Av command value, described later) that has been instructed from the camera body 10 can be maintained. As a result, there is substantially no change in the lens aperture value 34a (shown by the dashed line), even if the zoom encoder value 31 shown by the solid line in the drawing changes, since opening diameter is controlled by the aperture operation control section 23 so as to maintain the aperture value. In this case, as will be described later, there is no output of aperture drive command from the control section 11 of the camera body 10 (in the drawing, aperture drive commands are shown as diamonds).

In a state before executing a zoom operation, an aperture value (Av command value) that has been calculated by the exposure setting value calculation section 12 of the camera body 10 is transmitted to the aperture operation control section 23 of the lens barrel 20, and opening of the aperture 22 is controlled by the aperture operation section 25 so as to coincide with the commanded aperture value (Av command value). Specifically, actual aperture value (Av effective value) is controlled to a state where it is equal to the commanded aperture value (Av command value).

In a case where a non-compliant lens barrel shown in FIG. 3B is attached, even if the zoom position detection section 24 detects change in focal length (zoom encoder value) at the lens barrel 20 side, control of the opening diameter of the aperture 22 in accordance with this detected focal length so as to maintain an aperture value (Av command value) that has been instructed from the camera body 10 is not carried out. This means that since the opening diameter does not change even if the zoom encoder value 31 shown by the solid line in the drawing changes, the lens aperture value 34b (Av effective value) changes and the amount of light from the subject that is incident on the image sensor 16 changes.

If the exposure setting value calculation section 12 determines that the lens aperture value 34b (Av effective value) that has been acquired by means of communication from the lens barrel 20 has exceeded an aperture drive command determination threshold value 35, then an aperture value (Av command value) that should have already been calculated and transmitted to the aperture operation control section 23 is transmitted to the aperture operation control section 23 at the lens barrel 20 side again. On the other hand if the exposure setting value calculation section 12 determines that the lens aperture value 34b (Av effective value) has not exceeded the aperture drive command determination threshold value 35, retransmission of the aperture value (Av command value) to the aperture operation control section 23 at the lens barrel 20 side is not carried out (refer to aperture drive commands shown by the diamonds in the drawing). The aperture drive command determination threshold value 35 is set by adding or subtracting a given amount to or from an Av command value that instructed aperture control to the lens barrel 20, so that image quality of a stored movie or a live view display image is in a permissible range even if aperture value is changed.

At "10" and "20" on the horizontal axis in FIG. 3B, the reversal in the trend for lens aperture value 34b from increase to decrease is because the aperture value (Av command value) is retransmitted from the camera body 10 to the aperture operation control section 23 of the lens barrel 20, and opening diameter of the aperture 22 is controlled so as to become the aperture value (Av command value) that has been calculated by the aperture operation control section 23, as a result of the aperture value (Av effective value) that was acquired by the camera body 10 from the lens barrel 20 by means of communication having exceeded the aperture drive command determination threshold value 35.

In this way, with this embodiment, in a case where a non-compliant lens barrel is fitted, if it is determined that an aperture value (Av effective value) that has been acquired by the exposure setting value calculation section 12 from the lens barrel 20 has not exceeded the aperture drive command determination threshold value 35 the aperture value is not retransmitted. On the other hand, if it is determined that the aperture drive command determination threshold value 35 has been exceeded, the aperture value (Av command value) is retransmitted. The aperture operation control section 23 of the lens barrel 20 then receives the transmitted aperture value (Av command value), and controls opening diameter of the aperture 22 based on the aperture value (Av command value).

On the other hand, if a movie compliant lens barrel has been fitted, opening diameter of the aperture is automatically controlled at the lens barrel side to maintain aperture value. As a result, the aperture value (Av effective value) that has been acquired by the exposure setting value calculation section 12 from the lens barrel 20 does not exceed the aperture drive command determination threshold value. In this way, even if camera side control is not switched, this can be automatically adapted to in accordance with the type of lens barrel that has been fitted.

Next, aperture drive operation of this embodiment will be described using the flowcharts shown in FIG. 4 and FIG. 5. This processing flow is executed by the CPU within the control section 11 controlling each section in accordance with programs stored in the memory 18.

If the processing flow shown in FIG. 4 is commenced, first subject brightness (Bv) is calculated (S1). Here, the exposure setting value calculation section 12 is input with a pixel signal from the image sensor 16 by means of the imaging control section 15, and calculates subject brightness (Bv) based on this pixel signal.

If subject brightness (Bv) has been calculated, next Av effective value is acquired (S3). Even if the aperture has the same opening diameter, aperture value (FNo) differs in accordance with focal length, depending on the structure of the optical system. Av effective value is an effective aperture value (FNo) taking into consideration change in focal length, and is equivalent to lens aperture value 34a and 34b in FIG. 3A and FIG. 3B. Specifically, transmission of Av effective value to the lens barrel 20 is requested, and the aperture value (FNo) that will is transmitted is made the Av effective value.

If Av effective value has been acquired, it is next determined whether or not subject brightness (Bv) has changed from the time before (S5). The exposure setting value calculation section 12 calculates subject brightness (Bv) based on a pixel signal for every frame of the image sensor 16, and stores this subject brightness in memory. In this step it is determined whether or not there is change of greater than or equal to a given value, by comparing subject brightness (Bv) for the time before that is stored in the memory, and subject brightness (Bv) that has been acquired this time. If the result of this determination is that there is change in subject brightness, exposure setting values are calculated in step S9 and later, while if there is no change in subject brightness processing advances to step S6.

If the result of determination in step S5 is that subject brightness (Bv) has not changed from the time before, it is determined whether or not a zoom operation is in progress (S6). Whether or not a zoom operation is in progress is determined by detecting change in zoom information (for example, zoom encoder value and focal length) acquired by communication with the lens barrel 20. Then, in the event that a zoom operation is in progress processing advances to step S7, while if a zoom operation is not in progress processing advances to step S9. As a result of the photographer carrying out a zoom operation, focal length is changed, and even if the opening diameter of the aperture is the same there is change optically in a wide-open aperture value, and there may be cases where current aperture value (Av effective value) changes. There are also lenses of a time where wide-open aperture value changes as a result of a zoom operation.

In step S7 it is determined whether or not current aperture value (Av effective value) has changed as a result of change in wide-open aperture value during a zoom operation. Specifically, wide-open aperture value is also acquired instep S3 when acquiring Av effective value from the lens barrel 20. It is then determined whether or not the acquired wide-open aperture value has changed in a narrowing direction from the Av command value that was instructed in the previous frame. In the event that the wide-open aperture value has changed in a narrowing direction from the instructed Av command value, it means that the instructed Av command value cannot be mechanically maintained. Accordingly, in order to attain correct exposure it is necessary to recalculate Av command value from the Av command value of the previous frame and set it again, and to also recalculate other exposure control values and set those again. In this way, in the event that the current aperture value has changed, the exposure setting value calculation section 12 calculates exposure setting values similarly to when subject brightness (Bv) has changed.

If the result of determination in step S5 is that the subject brightness has changed from the time before, or if the result of determination in step S6 is that a zoom operation is not in progress, or if the result of determination in step S7 is that the current aperture value has changed as a result of change in wide-open aperture value at the time of zoom, exposure calculation is next commenced (S9). Here the exposure setting value calculation section 12 commences calculation based on subject brightness (Bv) that is based on the pixel signal from the image sensor 16.

If exposure calculation has commenced, first exposure setting value (Av command value) is calculated (S11). Here, Av value for attaining appropriate exposure is calculated in accordance with the exposure mode that has been set (for example, program mode, shutter priority mode etc.), and made the Av command value.

If the exposure setting value (Av command value) has been calculated, next and AV drive command is implemented (S13). Here the Av command value that was calculated in the exposure setting value calculation section 12 is transmitted via the aperture value transmission and reception section 13 to the aperture operation control section 23. In this way instruction for aperture drive operation is carried out for the lens barrel 20.

If the AV drive command has been implemented, next Av effective value is acquired (S15). Here an effective aperture value that considers change in focal length is acquired. Specifically, transmission of Av effective value to the lens barrel 20 is requested, and the aperture value that is transmitted is made the Av effective value.

Once Av effective value has been acquired, next exposure setting values (Tv, Sv command values) are calculated (S17). Here, the exposure setting value calculation section 12 respectively calculates electronic shutter speed (Tv) and ISO sensitivity (Sv) at the time of movie shooting and at the time of live view display.

If exposure setting values (Tv, Sv command values) have been calculated, next Tv and Sv setting commands are implemented (S19). Here the Tv and Sc command values that were calculated by the exposure setting value calculation section 12 are transmitted to the shutter speed and sensitivity operation control section 14, and control of electronic shutter speed and ISO sensitivity is carried out in the imaging control section 15.

Returning to step S7, if the result of determination in step S7 was that current aperture value (Av effective value) has not changed as a result of change in wide-open aperture value at the time of zoom, next previous values for exposure setting values (Tv, Sv and Av command values) are referenced (S21). The exposure setting values (Tv, Sv, Av) were calculated in steps S11, S17 and S33, and these calculated exposure setting values were temporarily stored in memory, and so the stored exposure setting values are read out.

Continuing on, it is determined whether or not exposure calculation is currently stopped (S23). As will be described later, if given conditions are satisfied exposure calculation is stopped in step S31. In this step it is determined whether or not this state where the exposure calculation is stopped is in effect.

If the result of determination in step S23 is that exposure calculation is not stopped it is next determined whether or not an absolute value of "Av command value—Av effective value" is within an exposure control stop permitted determination threshold value (S29). A difference between Av command value, which is a previous value, for aperture command value (Av command value) calculated by the exposure setting value calculation section 12, that was read out in step S21 (instructed Av command value that was calculated in the previous frame), and aperture value (Av effective value) transmitted from the lens barrel that was acquired in step S3, is compared with an exposure control stop permitted determination threshold value, and it is determined whether the aperture has been mechanically driven to attain the Av command value.

This is because in order to avoid stopping of the exposure calculation (exposure control) with there still being deviation of exposure control while the aperture is being driven, that is, the aperture has not been mechanically driven to attain the Av command value, and it is ensured that exposure calculation (exposure control) is not stopped until the aperture is driven to the Av command value. The exposure control stop permitted determination threshold value is set so as to be equivalent to an exposure error amount in the state where it is considered that the aperture has been driven mechanically and has reached the Av command value.

It should be noted that as well as a method of determination by the exposure setting calculation value section 12 using a difference between Av command value and Av effective value, the aperture operation control section 23 of the lens barrel 20 may determine whether aperture has reached the Av command value from output of the aperture operation section 25 (aperture drive signal etc.), and transmit information indicating that the aperture has been driven to reach the Av command value to the exposure setting value calculation section 12.

If the result of determination in step S29 is Yes, exposure calculation is stopped (S31). Since a difference between aperture command value (Av command value) that has been calculated by the exposure setting value calculation section 12 and aperture value that has been transmitted from the lens barrel (Av effective value) is sufficiently small, it is considered that aperture has been set to the Av command value and exposure calculation by the exposure setting value calculation section 12 is stopped.

On the other hand, if result of determination in step S29 is No, exposure setting values (Tv, Sv, SV command values) are calculated (S33). Since a difference between the Av command value, which was calculated by the exposure setting value calculation section 12 of the camera body 10 and made an aperture control command to the lens barrel 20, and the Av effective value transmitted from the lens barrel 20 is larger than the exposure control stop permitted determination threshold value, it is considered that the aperture has not reached the Av command value. In this case a state of waiting for the Av effective value to reach the Av command value is entered, and the exposure setting values (Tv, Sv command values) are calculated.

Next, Tv and Sv setting commands are implemented (S35). Here, the exposure setting commands that were calculated in step S33 (Tv and Sv command values) are transmitted to the shutter speed and sensitivity operation control section 14, and control of the electronic shutter speed and the ISO sensitivity is carried out in the imaging control section 15.

If the result of determination in step S23 is that exposure calculation is stopped, it is next determined whether or not the Av effective value has exceeded the aperture drive command determination threshold value (S25). The aperture value (Av effective value) transmitted from the lens barrel 20 is compared with the aperture drive command determination threshold value, and it is determined whether to output an aperture drive command to the lens barrel 20 based on the result of this comparison. Here there is processing to maintain appropriate exposure at the time of changing aperture value due to a zoom operation (FIG. 3B).

If the result of determination in step S25 is No, an Av drive command (aperture drive command) is implemented using the Av command value of the previous value that was referenced in step S21 (Av command value that was calculated in the previous frame and instructed aperture control) (S27). As shown in FIG. 3B, since a difference between the Av command value and the Av effective value (effective aperture value) has become large, the exposure setting value calculation section 12 instructs aperture control, to attain the previous Av command value, to the aperture operation control section 23.

If Tv and Sv setting commands have been implemented in step S19, or if the result of determination in step S25 was Yes, or if Av drive command implementation was carried out in step S27, or if exposure calculation stop was carried out in step S31, or if Tv and Sv setting command implementation was carried out in step S35, this processing flow is terminated. If a pixel signal for the next frame has been read out from the image sensor 16, operation from step S1 is started again. Exposure calculation is stopped in step S31, but the aperture control value (Av command value) may be prevented from being transmitted to the lens barrel 20 even if aperture control value (Av command value) is calculated without stopping execution of exposure calculation.

In this way, with this embodiment, it is determined whether or not aperture control can be performed at the lens side (refer to S25), and in the event that control cannot be performed, an aperture control signal (Av command value) is not transmitted from the camera body to the lens side (refer to S25, Yes).

Next, the aperture control operation of the lens barrel 20 will be described using the flowchart shown in FIG. 6A and FIG. 6B. This operation is executed by the CPU controlling each section within the lens barrel, based on program stored in the memory 28 that is connected to the aperture operation control section 23. It should be noted that as well as the aperture operation control section 23 the CPU also includes the zoom control section 26.

As was described previously, there may be a movie compliant lens or a non-compliant lens in the lens barrel. The flowchart shown in FIG. 6A shows an aperture control operation in a movie compliant lens, while the flowchart shown in FIG. 6B shows an aperture control operation in a non-compliant lens.

Figure 6A:
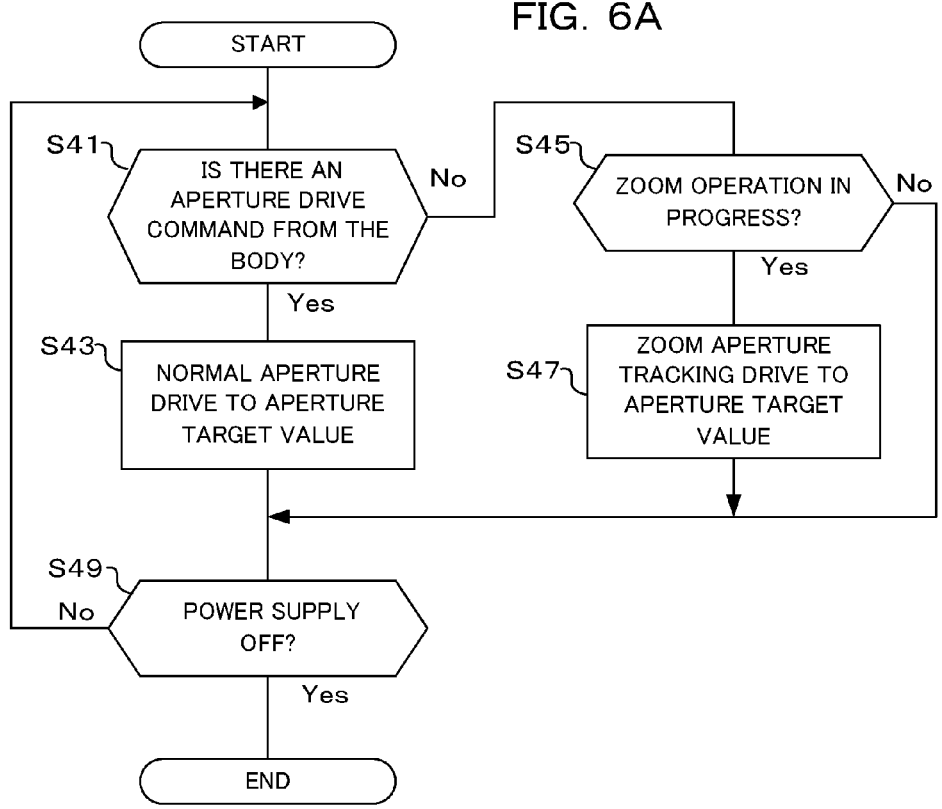
FIG. 6A and FIG. 6B are flowcharts showing aperture control operation, in a camera of one embodiment of the present invention, with FIG. 6A showing temperature control operation for a movie compliant lens, and FIG. 6B showing aperture control operation for a non-movie compliant lens.

In the case of a movie compliant lens, if the flow shown in FIG. 6A is entered it is first determined whether or not there is an aperture drive command from the body (S41). In previously described steps S13 and S27, the camera body 10 issued an aperture drive command to the lens barrel 20, and so in this step determination is based on whether this aperture drive command has been input.

If the result of determination in step S41 is that there is not an aperture drive command from the body, it is determined whether or not a zoom operation is in progress (S45). Here, whether or not a zoom operation is in progress is determined based on whether or not there has been change to a zoom encoder value from the zoom position detection section 24.

If the result of determination in step S45 is that a zoom operation is in progress, zoom aperture tracking drive is carried out to an aperture target value (S47). Here, the aperture operation control section 23 controls opening diameter of the aperture 22 so that aperture value does not change, by referencing a table showing relationship between zoom encoder value and aperture value and aperture opening diameter that has been stored in advanced, based on the zoom encoder value from the zoom position detection section 24.

If the result of determination in step S41 is that there has been an aperture drive command from the body, normal aperture drive is carried out to the aperture target value (S43). Here the aperture operation control section 23 carries out drive of the aperture to the aperture target value in accordance with aperture drive command (Av command value) that has been transmitted from the body.

If normal aperture drive to the aperture target value has been carried out in step S43, or if zoom aperture tracking drive to the aperture target value has been carried out in step S47, or if the result of determination in step S45 was not that zoom operation is in progress, it is determined whether will not there is a power supply off command from the camera body 10 (S49). If the result of this determination is that there is a power supply off command from the camera body 10, this flow is terminated. On the other hand if there is not a power supply off command, operation is repeated again from step S41.

Figure 6B:
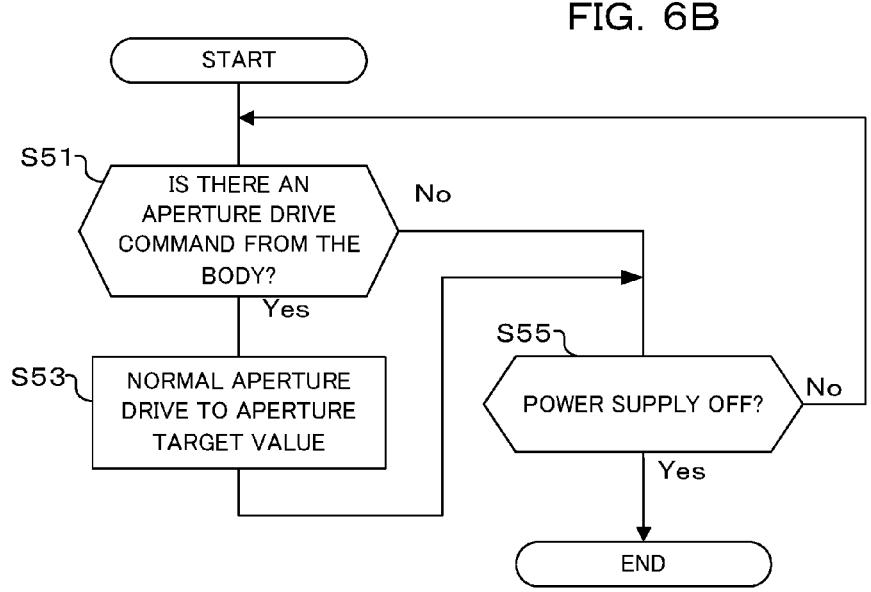

In the case of a non-compliant lens, if the flow shown in FIG. 6B is entered it is first determined whether or not there is an aperture drive command from the body (S51). In previously described steps S13 and S27, the camera body 10 issued an aperture drive command to the lens barrel 20, and so in this step determination is based on whether this aperture drive command has been input.

If the result of determination in step S51 is that there has been an aperture drive command (Av command value) from the body, normal aperture drive is carried out to the aperture target value (S53). Here the aperture operation control section 23 carries out drive of the aperture to the aperture target value in accordance with aperture drive command (Av command value) that has been transmitted from the body.

If normal aperture drive to the aperture target value has been carried out in step S53, or if the result of determination in step S51 was that there was not an aperture drive command from the body, it is determined whether or not there is a power supply off command from the camera body 10 (S55). If the result of this determination is that there is a power supply off command from the camera body 10, this flow is terminated. On the other hand if there is not a power supply off command, operation is repeated again from step S51.

As has been described above, with the one embodiment of the present invention, it is determined whether or not control of aperture opening by an aperture control section is possible based on information from the lens barrel 20 (Av effective value of S3 in FIG. 4), and if it is determined that control of aperture opening can be performed an aperture control signal is not transmitted to the aperture control section (S25 Yes in FIG. 5). As a result it is possible to suppress the occurrence of lowering of image quality due to flicker in an image due to aperture drive in accordance with a zoom operation at the time of movie recording or at the time of live view display. Specifically, as was described using FIG. 3A, in a case where a movie compliant lens has been fitted to the camera body 10, since zoom aperture tracking is carried out at the lens barrel 20 side an aperture control signal is not transmitted from the camera body 10, and it is possible to prevent lowering of image quality such as flicker in an image caused by aperture drive in accordance with a zoom operation while movie recording is in progress.

Also, as was described using FIG. 3B, in a case where a non-movie compliant lens is fitted to the camera body 10, in the event that an actual aperture value (Av effective value) of the lens barrel during a zoom operation does not exceed a given threshold value, namely when a difference between an aperture value for which aperture control has been instructed (Av command value) and an actual aperture value (Av effective value) is small, an aperture control signal is not transmitted from the camera body 10. Accordingly it is possible to prevent lowering of image quality such as image flicker due to aperture drive in accordance with a zoom operation during movie recording. On the other hand if the actual aperture value (Av effective value) exceeds a given threshold value, namely when a difference between an aperture value for which aperture control has been instructed (Av command value) and an actual aperture value (Av effective value) is large and appropriate exposure is not achieved, aperture value to achieve appropriate exposure is calculated again and aperture control is instructed, and so it is possible to continuously maintain appropriate exposure.

It should be noted that in the one embodiment of the present invention both electronic shutter speed (Tv) and ISO sensitivity (Sv) have been calculated as exposure setting values, but it is also possible to calculate only one of these values.

Also, with each of the embodiments of the present invention the exposure setting value calculation section 12, aperture value transmission and reception section 13 and shutter speed and sensitivity operation control section 14 are configured inside the control section 11, with sections being executed in software using the CPU, and sections being configured using hardware. However, all of the above-described sections may be configured using hardware, and conversely functions of all of the above described sections maybe executed as software.

Further, with this embodiment, an imaging apparatus has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, game console etc. In any event, it is possible to adopt the present invention as long as a device is capable of shooting by carrying out exposure control using an aperture.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging apparatus, comprising a lens unit having a photographing optical system, and a body, to which the lens unit can be attached, having an image sensor for generating a pixel signal by imaging subject light that has passed through the photographing optical system, wherein:
   the lens unit comprises
   an aperture which restricts light flux that passes through the photographing optical system,
   a zoom control section which adjusts focal length of the photographing optical system, and
   an aperture control section which controls opening of the aperture, and
   the body comprises
   an exposure control section which adjusts exposure amount for image data based on a pixel signal generated by the image sensor, by transmitting an aperture control signal to the aperture control section and changing opening of the aperture, and
   a determination section which determines whether or not the aperture control section is able to control opening of the aperture based on information from the lens unit, wherein
   the exposure control section does not transmit aperture control signals to the aperture control section when it is determined by the determination section that the aperture control section is able to control opening of the aperture.

2. The imaging apparatus of claim 1, wherein:
   the determination section determines that the aperture control section is able to control opening of the aperture based on information on the opening of the aperture.

3. The imaging apparatus of claim 2, wherein:
   the determination section determines whether or not the aperture control section is able to control opening of the aperture by comparing an aperture control signal of the exposure control section and information on opening of the aperture, and
   the exposure control section transmits an aperture control signal to the aperture control section when it is determined by the determination section that opening of the aperture can not be controlled by the aperture control section.

4. The imaging apparatus of claim 1, wherein:
   the body has an exposure calculation section for calculating exposure control amount for image data based on a pixel signal generated by the image sensor, and
   when the determination section determines that a difference between the control signal for aperture control and information on the opening of the aperture is within a given range, calculation of the exposure control amount is stopped.

5. An imaging method, for an imaging apparatus that comprises a lens unit having a photographing optical system, and a body, to which the lens unit can be attached, having an image sensor for generating a pixel signal by imaging subject light that has passed through the photographing optical system, wherein:
   in the lens unit
   light flux passing through the photographing optical system is restricted using an aperture,
   focal length of the photographing optical system is adjusted, and
   opening of the aperture is controlled, and
   in the body
   exposure amount for image data is adjusted based on a pixel signal generated by the image sensor, by transmitting an aperture control signal to the lens unit and changing opening of the aperture,
   it is determined whether or not the opening of the aperture can be controlled based on information from the lens unit, and
   if it is determined that opening of the aperture can be controlled, aperture control signals are not transmitted to the lens unit.

6. The imaging method of claim 5, wherein:
   in the determination step it is determined that the opening of the aperture can be controlled based on information on the opening of the aperture.

7. The imaging method of claim 6, wherein:
   in the determination step it is determined whether or not opening of the aperture can be controlled by comparing an aperture control signal and information on opening of the aperture, and
   in the step of adjusting the exposure amount, if it is determined that opening of the aperture cannot be controlled, and aperture control signal is transmitted to the lens unit.

8. The imaging method of claim 5, wherein:
   in the body an exposure control amount for image data is calculated based on a pixel signal generated by the image sensor, and
   in the determination step, if it is determined that a difference between the control signal for aperture control and information on the opening of the aperture is within a given range, calculation of the exposure control amount is stopped.

9. A non-transitory computer-readable medium storing a computer program for controlling an imaging apparatus, the imaging apparatus comprising:
   a lens unit having a photographing optical system, and a body, to which the lens unit can be attached, having an image sensor for generating a pixel signal by imaging subject light that has passed through the photographing optical system, wherein:
   the computer program, in the lens unit
   restricts light flux passing through the photographing optical system using an aperture,
   adjusts focal length of the photographing optical system, and
   controls opening of the aperture, and
   the computer program, in the body, adjusts exposure amount for image data based on a pixel signal generated by the image sensor, by transmitting aperture control signals to the aperture control section and changing opening of the aperture, and determines whether or not the aperture control section can control opening of the aperture based on information from the lens unit, and if it is determined that opening of the aperture can be controlled, aperture control signals are not transmitted to the lens unit.

10. The non-transitory computer-readable medium of claim 9, wherein in the determination step it is determined that the opening of the aperture can be controlled based on information on the opening of the aperture.

11. The non-transitory computer-readable medium of claim 9, wherein in the determination step it is determined whether or not opening of the aperture can be controlled by comparing an aperture control signal and information on opening of the aperture, and in the step of adjusting the exposure amount, if it is determined that opening of the aperture cannot be controlled, an aperture control signal is transmitted to the lens unit.

12. The non-transitory computer-readable medium of claim 9, wherein in the body an exposure control amount for image data is calculated based on a pixel signal generated by the image sensor, and in the determination step, if it is determined that a difference between the control signal for aperture control and information on the opening of the aperture is within a given range, calculation of the exposure control amount is stopped.

* * * * *